Patented Aug. 9, 1938

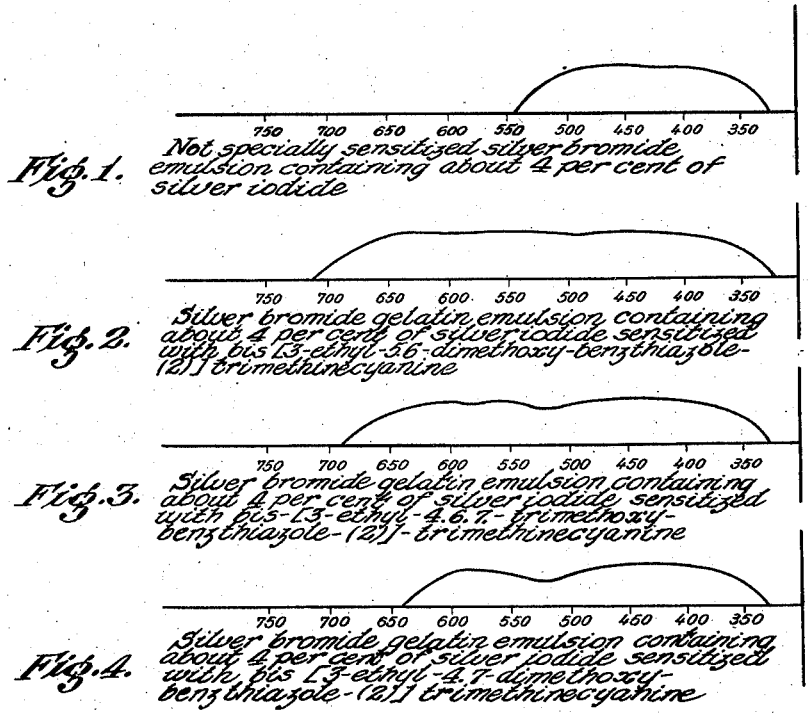

2,126,078

UNITED STATES PATENT OFFICE 2,126,078

SENSITIZING PHOTOGRAPHIC EMULSION

Walter Zeh, Dessau in Anhalt, Adolf Sieglitz, Frankfort-on-the-Main-Sindlingen, and Martin Dabelow, Frankfort-on-the-Main-Hochst, Germany, assignors to Agfa Ansco Corporation, Binghamton, N. Y., a corporation of New York Application February 28, 1935, Serial No. 8,656
In Germany April 26, 1932

2 Claims. (Cl. 95—7)

Our present invention relates to sensitizing of photographic emulsion. It is a continuation in part of our co-pending application Ser. No. 667,712, filed April 24, 1933.

One of its objects is to provide such an emulsion the sensitivity of which is raised over the range of wave lengths to which the emulsion is normally sensitive. Another object are the dyes incorporated in the emulsion in order to increase its sensitiveness. Further objects will be seen from the detailed specification following hereafter. Reference is made to the accompanying drawing which shows the spectrograms of an unsensitized emulsion and differently sensitized emulsions.

It is already known to sensitize silver halide emulsions by means of trimethinecyanines which are substituted in the benzene nucleus. These dyes when suitably selecting the substituents distinguish over the non-substituted dyes by an increased sensitizing power.

This invention is based on the discovery that the disubstitution products of the trimethinecyanines of which the 5.6-positions of the benzene nucleus are occupied by equal or dissimilar substituents are far superior to all other substituted dyestuffs. It has proved that these dyes substituted in the 5 and 6 positions are superior with regard to their sensitizing action to those substituted, for instance, in the 5 or 6 position or to the disubstituted dyes when containing the substituents in other positions of the benzene nucleus or even to trisubstituted dyes.

The dyestuffs suitable for the present process are derived from the following formulae:

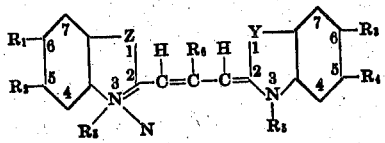

Y and Z stand for S, Se, or

wherein R' and R'' may be alkyl or aryl,
R₁, R₂, R₃ and R₄ stand for alkyl, alkoxy, thioalkyl, selenoalkyl, aryl or aryloxy,
R₅ stands for alkyl,
R₆ stands for hydrogen, alkyl, aryl, aralkyl or thienyl, and
X stands for Cl, Br, I, SO₄CH₃, ClO₄ or another acid radical.

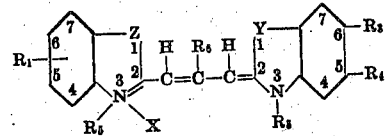

Y and Z stand for S, Se, or

wherein R' and R'' may be alkyl or aryl,
R₁, R₃ and R₄ stand for alkyl, alkoxy, thioalkyl, selenoalkyl, aryl or aryloxy (R₃ and R₄ may be bound in 5.6-position),
R₅ stands for alkyl,
R₆ stands for hydrogen, alkyl, aryl, aralkyl or thienyl, and
X stands for Cl, Br, I, SO₄CH₃, ClO₄ or another acid radical.

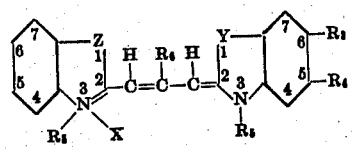

Y and Z for S, Se, or

wherein R' and R'' may be alkyl or aryl,
R₃ and R₄ stand for alkyl, alkoxy, thioalkyl, selenoalkyl, aryl or aryloxy (R₃ and R₄ may be bound in 5.6-position)
R₅ stands for alkyl,
R₆ stands for hydrogen, alkyl, aryl, aralkyl or thienyl, and
X stands for Cl, Br, I, SO₄CH₃, ClO₄ or another acid radical.

Furthermore the hydrogen atoms of the lateral members of the polymethine chains may be substituted by similar or dissimilar alkyl groups.

Instead of two alkoxy groups for the substitution of trimethinecyanines in 5- and 6-positions, there may be used a dioxymethylene group or a dioxyethylene group. In the same way two aryloxy groups may be replaced by a dioxyphenylene group.

In the accompanying drawing there are reproduced four spectrograms of the same silver bromide gelatin emulsion containing about 4 per cent of silver iodide.

Fig. 1 shows the spectrogram of the unsensitized emulsion,

Fig. 2 shows the spectrogram of the emulsion sensitized with bis-[3-ethyl-5.6-dimethoxy-benzthiazole-(2)]-trimethine-cyanine bromide, Fig. 3 shows the spectrogram of the emulsion sensitized with bis-[3-ethyl-4.6.7-trimethoxy-benzthiazole-(2)]-trimethinecyanine bromide, Fig. 4 shows the spectrogram of the emulsion sensitized with bis-[3-ethyl-4.7-dimethoxy-benzthiazole-(2)]-trimethinecyanine iodide.

In the spectrograms the abscissae are graduated in millimicrons ($\mu\mu$) while the ordinates are graduated in divisions denoting the blackening of the tested film. The blackenings are taken by exposing the film in a diffraction grating spectrograph of Carl Zeiss, Jena, provided with a Rowland diffraction grating, and illuminating with a nitra lamp of 100 watts through a stage slot. The stage slot has 6 stages and exposure is thus effected that the 6th stage is just visible in the standard sensitiveness of the emulsion or in the range of sensitiveness imparted to the emulsion by the sensitizer.

The dyes are obtainable according to the desired solubility in form of the bromide, iodide, perchlorate etc. and are used in a quantity as usual for the known sensitizing dyes. This quantity amounts to about 10 to 30 milligrams per 1 kg. of emulsion ready for being cast which contains about 9 per cent of gelatin, 4.5 per cent of silver-halide, the rest being water. However, we do not wish to limit our invention to the quantities just indicated, the most suitable amount will in each case be found by a few comparative experiments. The dyes may be added to the emulsion in form of solutions. Suitable solvents are the alcohols, for instance, methyl or ethyl alcohol which may be used anhydrous or diluted with water. The dyes are applied to the emulsion during any stage of its production, however, they are preferably added to the finished emulsion before being cast.

The dyes may likewise be added by bathing the finished photographic material in a bath in which the dye is dissolved. Such a treatment may be as follows: The photographic material to be sensitized is bathed in a solution containing 1 milligram of the dye, for instance, bis-[3-ethyl-5.6-dimethoxy-benzthiazole-(2)]-trimethinecyanine bromide in 100 cc. of an aqueous solution of methanol of 50 per cent strength for about 5 minutes. The material is then dried, whereupon it is ready for use.

The preparation of the dyes and the bases from which the dyes are prepared is analogous to known methods.

1. The preparation of 5.6-dimethoxy-2-methylbenzthiazole is described by Fries in "Annalen der Chemie", vol. 468, 1929, pages 170 and 171.

2. The bases 5.6-diethoxy-2-methylbenzthiazole and 5.6-methylenedioxy-2-methylbenzthiazole are prepared according to the same method by starting from the corresponding amines.

3. The base 2.5.6-trimethylbenzthiazole is prepared analogously to known methods in the following way:

(a) 4-amino-1.2-xylene+potassium rhodanate = 3.4-dimethylphenylthiourea.

(b) The thiourea is transformed into 2-amino-5.6-dimethylbenzthiazole by means of sulfurylchloride.

(c) The aminothiazole is made into 1-amino-2-mercapto-4.5-dimethylbenzene by means of potassium hydroxide under pressure.

(d) The aminomercaptane yields the 2.5.6-trimethylbenzthiazole when treated with acetic anhydride.

4. The preparation of 2-methyl-5-methoxy-6-meth-thiobenzthiazole is as follows:

(a) By the reaction on 1-chloro-2-methoxy-4-nitrobenzene with sodium disulfide the di-(2-methoxy-4-nitro-phenyl)-disulfide is formed.

(b) The disulfide is dissolved in sodium hydrosulfide and methylated by means of dimethylsulfate. There is obtained 1-meth-thio-2-methoxy-4-nitrobenzene.

(c) The nitro product is reduced to 1-meth-thio-2-methoxy-4-amino-benzene.

(d) The amino compound is made into the thiazole according to the method described by Fries above referred to.

5. The 2.5-dimethyl-5-ethoxybenzthiazole and 2.5-dimethyl-6-ethoxybenzothiazole are obtainable according to the method disclosed by Fries above referred to from 3-ethoxy-4-methyl-1-aminobenzene and 3-methyl-4-ethoxy-1-aminobenzene respectively.

The preparation of the seleno-azole bases is effected according to the method disclosed in "Berichte der Deutschen Chemischen Gesellschaft", vol. 46, 1913, pages 92 to 97, by starting from 4.5 disubstituted o-nitroanilines corresponding with the general formula

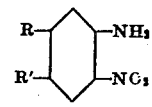

The following examples serve to illustrate our invention.

Example 1.—The dye bis-[3-ethyl-5.6-dimethoxy-benzthiazole-(2)]-trimethinecyanine iodide corresponding with the formula

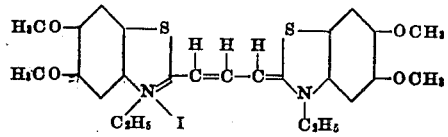

may be obtained by heating 10 grams of 2-methyl-5.6-dimethoxybenzothiazole and 10 grams of p-toluene sulfonic acid ethyl ester for 3 hours to 130° C. After cooling the mixture 100 cc. of dry pyridine and 15 grams of triethyl-o-formate are added and the mixture is heated for 2 hours under reflux. After removing the pyridine by distillation in the vacuum the residue is dissolved in 250 cc. of alcohol and to the solution there is added a concentrated aqueous solution of 4.1 grams of potassium iodide. The dye crystallizes in the form of green rods and is recrystallized from alcohol.

The alcoholic solution of the dye has an absorption maximum at a wave length of about 595$\mu\mu$.

Incorporated in a gelatino silver bromide emulsion containing about 4 per cent of silver iodide, the dye imparts to it a range of sensitiveness from about 500$\mu\mu$ to 710$\mu\mu$ with a maximum at about 625$\mu\mu$.

Example 2.—The dye bis-[3-ethyl-5.6-diethoxy-benzthiazole-(2)]-trimethinecyanine iodide corresponding with the formula

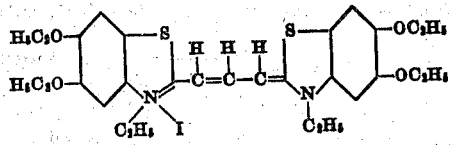

may be obtained by heating 12 grams of 2-methyl-5.6-diethoxybenzthiazole with 10 grams of p-toluene sulfonic acid ethyl-ester for 3 hours to 130° C. After cooling there are added 120 cc. of dry pyridine and 15 grams of triethyl o-formate and the mixture is boiled for 2 hours under reflux. The further working up of the dye is as described in Example 1. The dye crystallizes from alcohol in the form of green rods.

The alcoholic solution of the dye has an absorption maximum at a wave length of about 600μμ.

Incorporated in a gelatino silver bromide emulsion containing about 4 per cent of silver iodide, the dye imparts to it a range of sensitiveness from about 500μμ to about 710μμ with a maximum at about 630μμ which is flat.

Example 3.—The dye bis-[3-ethyl-5.6-methylenedioxy - benzthiazole -(2)]-trimethinecyanine-bromide corresponding with the formula

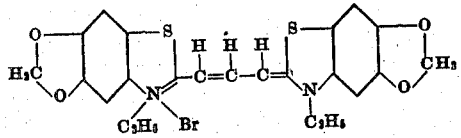

may be obtained by heating 9.6 grams of 2-methyl-5.6-methylenedioxybenzthiazole with 10 grams of p-toluene sulfonic acid ethylester for about 3 hours to 130° C. After cooling there are added 120 cc. of dry pyridine and 15 grams of triethyl o-formate whereupon the mixture is boiled for about 2 hours under reflux. The further working up of the dye is as described in Example 1. The dye crystallizes from alcohol in green rhombic crystals.

The alcoholic solution of the dye has an absorption maximum at a wave length of about 595μμ.

Incorporated in a gelatino silver bromide emulsion containing about 4 per cent of silver iodide, the dye imparts to it a range of sensitiveness from about 500μμ to 710μμ with a maximum at about 640μμ.

Example 4.—The dye bis-[3-ethyl-5.6-dimethyl-benzthiazole-(2)] - β-methyl-trimethinecyanine iodide corresponding with the formula

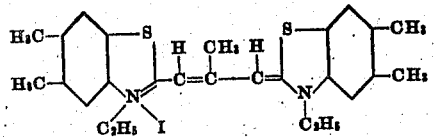

is obtained by heating 8.8 grams of 2.5.6-trimethylbenzthiazole and 10 grams of p-toluene sulfonic acid ethylester for 3 hours to 140° C. After cooling there are added 15 grams of triethyl o-acetate and 120 cc. of dry pyridine and the mixture is boiled for 2 hours under reflux. Then the pyridine is removed by distillation in the vacuum, the residue is dissolved in 250 cc. of alcohol and to this solution there is added a concentrated aqueous solution of 4.1 grams of potassium iodide. The dye which crystallizes is recrystallized from anhydrous alcohol and is then obtained in the form of green tetrahedral crystals.

The alcoholic solution of the dye has an absorption maximum at a wave length of about 555μμ.

Incorporated in a gelatino silver bromide emulsion containing about 4 per cent of silver iodide, the dye imparts to it a range of sensitiveness from about 500μμ to 680μμ with a maximum at about 600μμ which is very flat.

Example 5.—The dye bis-[3-ethyl-5.6-dimethoxy - benzthiazole-(2)]-β-ethyltrimethinecyanine iodide corresponding with the formula

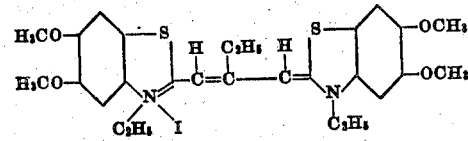

is obtained when working as described in Example 1 but using triethyl o-propionate instead of triethyl o-formate. The dye crystallizes from alcohol in the form of green massive plates.

The alcoholic solution of the dye has an absorption maximum at a wave length of about 585μμ.

Incorporated in a gelatino silver bromide emulsion containing about 4 per cent of silver iodide, the dye imparts to it a range of sensitiveness from about 490μμ to 690μμ with a maximum at about 600μμ which is very flat.

Example 6.—The dye bis-[3-ethyl-5.6-diethoxy - benzthiazole -(2)]-β-methyl-trimethinecyanine iodide corresponding with the formula

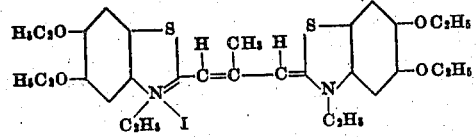

is obtained when working as described in Example 2, but using triethyl o-acetate instead of triethyl o-formate. The dye crystallizes from alcohol in the form of bluish violet rods.

The alcoholic solution of the dye has an absorption maximum at a wave length of about 585μμ.

Incorporated in a gelatino silver bromide emulsion containing about 4 per cent of silver iodide, the dye imparts to it a range of sensitiveness from about 490μμ to 690μμ with a maximum at about 605μμ which is very flat.

Example 7.—The dye bis-[3-ethyl-5.6-dimethoxy-benzselenazole-(2)] - trimethinecyanine iodide corresponding with the formula

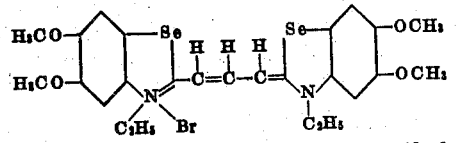

is obtained by heating 5 grams of 2-methyl-5.6-dimethylbenzselenazole diethylsulfate (prepared by heating 10 grams of 2-methyl-5.6-dimethoxy-benzselenazole with 6 cc. of diethylsulfate for 3 hours to 100° C. and purifying the reaction product by washing with acetone) 10 cc. of pyridine and 5 grams of triethyl o-formate for about 1 hour to 130° C. On the addition of about 30 cc. of an aqueous solution of potassium bromide of 10 per cent strength the dye separates in the form of blue flakes. Recrystallization from alcohol yields greenish blue felted needles.

The alcoholic solution of the dye has an absorption maximum at a wave length of about 610μμ.

Incorporated in a gelatino silver bromide emulsion containing about 4 per cent of silver iodide, the dye imparts to it a range of sensitiveness from about 500μμ to 730μμ with a maximum at about 650μμ.

Example 8.—The dye bis-[3-ethyl-5.6-diethoxy - benzselenazole - (2) ] - trimethinecyanine bromide corresponding with the formula

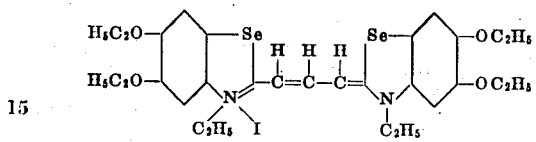

is obtained when working according to Example 7, but starting from 2-methyl-5.6-diethoxybenzselenazole diethylsulfate. The dye crystallizes from alcohol in the form of blue little rods.

The alcoholic solution of the dye has an absorption maximum at a wave length of about 610μμ.

Incorporated in a gelatino silver bromide emulsion containing about 4 per cent of silver iodide, the dye imparts to it a range of sensitiveness from about 500μμ to 730μμ with a maximum at about 650μμ.

Example 9.—The dye bis-[3-ethyl-5.6-ethylenedioxy-benzselenazole-(2)]-trimethinecyanine iodide corresponding with the formula

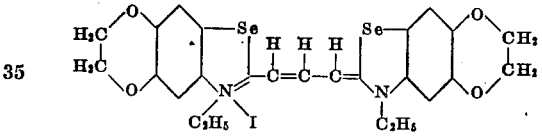

is obtained when condensing 2-methyl-5.6-ethylenedioxybenzselenazole diethylsulfate with triethyl o-formate and precipitating the dye with an aqueous solution of potassium idodide, of 10 per cent strength as described in Example 7. The dye crystallizes from alcohol in the form of little greenish blue felted rods.

The alcoholic solution of the dye has an absorption maximum at a wave length of about 610μμ.

Incorporated in a gelatino silver bromide emulsion containing about 4 per cent of silver iodide, the dye imparts to it a range of sensitiveness from about 500μμ to 730μμ with a maximum at about 650μμ.

Example 10.—The dye bis-[3-ethyl-5.6-ethylenedioxy - benzselenazole-(2) ]-β-ethyl - trimethinecyanine bromide corresponding with the formula

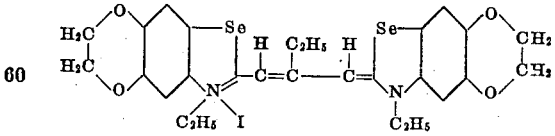

is obtained when working according to Example 9, but using triethyl o-propionate instead of triethyl o-formate.

The alcoholic solution of the dye has an absorption maximum at a wave length of about 590μμ.

Incorporated in a gelatino silver bromide emulsion containing about 4 per cent of silver iodide, the dye imparts to it a range of sensitiveness from about 490μμ to 710μμ with a maximum at about 620μμ.

Example 11.—The dye bis-[3-ethyl-5.6-dimethoxy-benzselenazole-(2) ] - β - ethyl-trimethinecyanine perchlorate corresponding with the formula

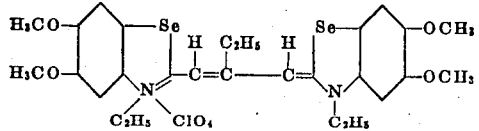

is obtained by boiling 5 grams of 2-methyl-5.6-dimethoxybenzselenazole diethylsulfate and 5 grams of triethyl o-propionate in 10 cc. of dry pyridine under reflux for about 1 hour. On the addition of 30 cc. of an aqueous solution of sodium perchlorate of 10 per cent strength the dye separates. Recrystallization from alcohol yields blue needles.

The alcoholic solution of the dye has an absorption maximum at a wave length of about 595μμ.

Incorporated in a gelatino silver bromide emulsion containing about 4 per cent of silver iodide, the dye imparts to it a range of sensitiveness from about 490μμ to 710μμ with a maximum at about 610μμ.

Example 12.—The dye bis-[3-ethyl-5.6-dimethyl-benzthiazole-(2) ]-β-ethyl-trimethinecyanine iodide corresponding with the formula

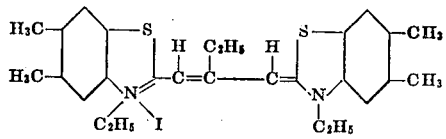

is obtained when working as described in Example 4 and replacing the triethyl o-acetate by triethyl o-propionate. The dye crystallizes from alcohol in the form of bluish green little rods.

The alcoholic solution of the dye has an absorption maximum at a wave length of about 562μμ.

Incorporated in a gelatino silver bromide emulsion containing about 4 per cent of silver iodide, the dye imparts to it a range of sensitiveness from about 500μμ to 650μμ with a maximum at about 600μμ.

Example 13.—The dye bis-[3-ethyl-5-phenyl-6-methoxy - benzthiazole - (2) ] - trimethinecyanine bromide corresponding with the formula

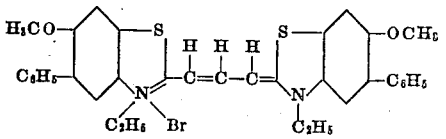

is obtained by heating 12.7 grams of 2-methyl-5-phenyl-6-methoxybenzthiazole with 10 grams of p-toluene sulfonic acid ethylester for 3 hours to 130° C. and condensing the reaction product with 15 grams of triethyl o-formate in 120 cc. of pyridine and further working up the product in the manner described in Example 1 with the exception that the dye is precipitated by means of about 20 cc. of an aqueous solution of potassium bromide of 20 per cent strength. The dye crystallizes from alcohol in the form of little green rods.

The alcoholic solution of the dye has an absorption maximum at a wave length of about 585μμ.

Incorporated in a gelatino silver bromide emulsion containing about 4 per cent of silver iodide, the dye imparts to it a range of sensitiveness from about 500μμ to 700μμ with a maximum at about 620μμ.

Example 14.—The dye bis-[3-ethyl-5-methoxy-6-methylthiobenzthiazole - (2)] - trimethinecyanine bromide corresponding with the formula

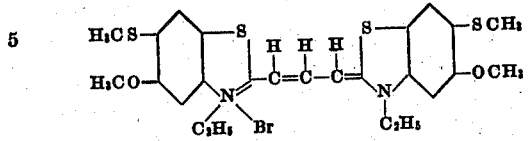

is obtained when working according to Example 12, but starting from 11.7 grams of 2-methyl-5-methoxy-6-meth-thiobenzthiazole and 10 grams of p-toluene sulfonic acid ethylester. The dye crystallizes from alcohol in the form of bluish green felted needles.

The alcoholic solution of the dye has an absorption maximum at a wave length of about 610μμ.

Incorporated in a gelatino silver bromide emulsion containing about 4 per cent of silver iodide, the dye imparts to it a range of sensitiveness from about 510μμ to 720μμ with a maximum at about 640μμ which is very flat.

Example 15.—The dye bis-[1.3.6-tetramethyl-5-chloro-indole-(2)]-trimethinecyanine chloride corresponding with the formula

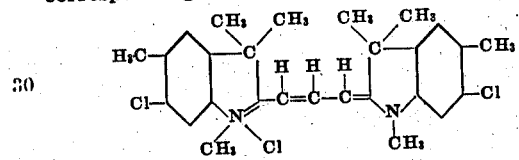

is obtained when working in the manner described in the example of U. S. Patent 1,524,791 and starting from 1.3.3.5-methyl-6-chloro-2-methylene-indoline.

The alcoholic solution of the dye has an absorption maximum at a wave length of about 560μμ.

Incorporated in a gelatino silver bromide emulsion containing about 4 per cent of silver iodide, the dye imparts to it a range of sensitiveness of about 500μμ to 630μμ with a maximum at about 590μμ.

Example 16.—The dye [3-ethyl-benzselenazole-(2)]-[3-ethyl-5.6 - dimethylbenzthiazole-(2)]-β-ethyl-trimethinecyanine iodide corresponding with the formula

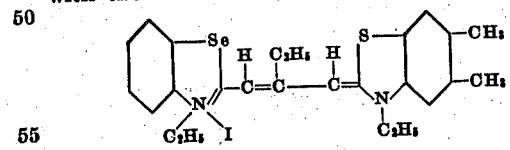

is obtained as follows:

(a) 10 grams of 2-methylbenzselenazole ethiodide and 9 cc. of ethylisothiopropionanilide are heated to about 165° to 170° for about 1¼ hours while repeatedly stirring. There is produced a homogeneous melt of dark color which is dissolved in 15 cc. of alcohol. This solution is mixed with about 20 cc. of ether while stirring. The intermediate product which crystallizes is filtered and recrystallized from alcohol.

(b) 5 grams of this intermediate product, 5 grams of 2.5.6-trimethylbenzthiazole ethiodide and 10 cc. of pyridine are heated for about 1½ hours to 130° to 140° C. so that finally there is evaporated about half of the pyridine quantity employed. Hereafter there are added to the reaction mixture a few cc. of an aqueous solution of potassium iodide of 10 per cent strength and a small amount of water. After cooling the dye separates. The dye may be purified by recrystallization from alcohol.

The alcoholic solution of the dye has an absorption maximum at a wave length of about 565μμ.

Incorporated in a gelatino silver bromide emulsion containing about 4 per cent of silver iodide, the dye imparts to it a range of sensitiveness of about 500μμ to 700μμ with a maximum at about 650μμ.

Example 17.—The dye [3-ethyl-benzthiazole-(2)]-[3-ethyl-5.6 - dimethyl - benzthiazole - (2)]-β-ethyl-trimethinecyanine iodide corresponding with the formula

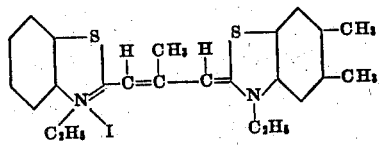

is obtained as follows:

(a) A mixture of 10 grams of 2-methylbenzthiazole ethiodide 7 grams of ethylisothio-acetanilide and 25 cc. of acetic anhydride are boiled for about 4 hours under reflux. After cooling and the addition of much ether a thickly liquid brown mass separates. The ether is decanted and the mass is further washed two times with ether by decanting. The residue is dissolved in about 12 cc. of alcohol at a temperature of about 50° to 60° C. After cooling the intermediate product corresponding probably with the formula

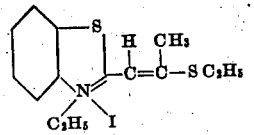

separates in the form of crystals.

(b) 3 grams of this intermediate product, 3 grams of 2.5.6-trimethylbenzthiazole ethiodide and 12 cc. of pyridine are boiled for 1¼ hours. The dye is precipitated by the addition of a few cc. of an aqueous solution of potassium iodide of 10 per cent strength and is recrystallized from alcohol.

The alcoholic solution of the dye has an absorption maximum at a wave length of about 555μμ.

Incorporated in a gelatino silver bromide emulsion containing about 4 per cent of silver iodide, the dye imparts to it a range of sensitiveness of about 500μμ to 690μμ with a maximum at about 600μμ.

Example 18.—The dye [3-ethyl-benzselenazole-(2)]-[3-ethyl-5-ethoxy - 6 - methylbenzthiazole-(2)]-β-ethyl-trimethinecyanine iodide corresponding with the formula

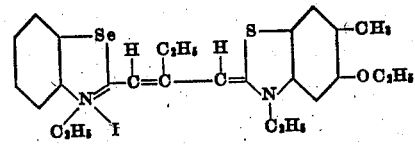

is obtained by boiling 6 grams of the intermediate product described in Example 16, 6 grams of 5-ethoxy-2.6-dimethylbenzthiazole ethiodide and 18 cc. of pyridine and working up the reaction mixture as described sub. (b) in Example 16. The dye may be purified by recrystallization from alcohol.

The alcoholic solution of the dye has an absorption maximum at a wave length of about 570μμ.

Incorporated in a gelatino silver bromide emulsion containing about 4 per cent of silver iodide, the dye imparts to it a range of sensitiveness of about 505μμ to 705μμ with a maximum at about 655μμ.

*Example 19.*—The dye [3-ethyl-5-methoxy-benzselenazole-(2)]-[3-ethyl-5,6-dimethyl-benzthiazole-(2)]-β-ethyl-trimethinecyanine perchlorate corresponding with the formula

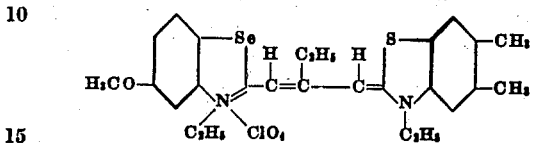

is obtained by boiling 10 grams of the intermediate product produced as described in Example 16, by starting from 2-methyl-5-methoxybenzselenazole ethiodide, 10 grams of 2,5,6-trimethylbenzthiazole ethiodide and 30 cc. of pyridine for about 1 hour to 130° C. The dye is precipitated from its solution in pyridine by the addition of 5 cc. of an aqueous solution of sodium perchlorate of 10 per cent strength. Recrystallization from alcohol yields bluish green felted crystals.

The alcoholic solution of the dye has an absorption maximum at a wave length of about 575μμ.

Incorporated in a gelatino silver bromide emulsion containing about 4 per cent of silver iodide, the dye imparts to it a range of sensitiveness of about 500μμ to 710μμ with a maximum at about 665μμ.

It is to be understood that our invention is not limited to the foregoing examples or to the specific details given therein. Numerous other embodiments are possible and we contemplate as included within our invention all such modifications and equivalents as fall within the scope of the appended claims. The nomenclature used is familiar to every chemist skilled in the art and has the advantage of clearness. The formulae of the dyes as given herein represent the molecular structure of our new dyes so far as known. If, however, in future it should become evident that the formulae do not exactly correspond to the dyes, this fact will not affect our invention since the dyes will be easily identified by the method of producing the same which has been fully described in the examples and is analogous to known methods.

What we claim is:

1. A photographic material comprising a silver halide emulsion containing a dye corresponding with the formula

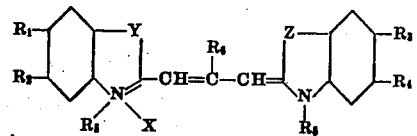

wherein

Y and Z stand for a member selected from the group consisting of S and Se, $R_1$, $R_2$, $R_3$ and $R_4$ stand for a member selected from the group consisting of alkyl and alkoxy, $R_5$ stands for alkyl, $R_6$ stands for a member selected from the group consisting of hydrogen and alkyl, X stands for an anion capable of precipitating the dye.

2. A photographic material comprising a silver halide emulsion containing bis-[3-ethyl-5,6-dimethoxy-benzthiazole-(2)]-trimethinecyanine iodide.

WALTER ZEH.
ADOLF SIEGLITZ.
MARTIN DABELOW.